United States Patent Office.

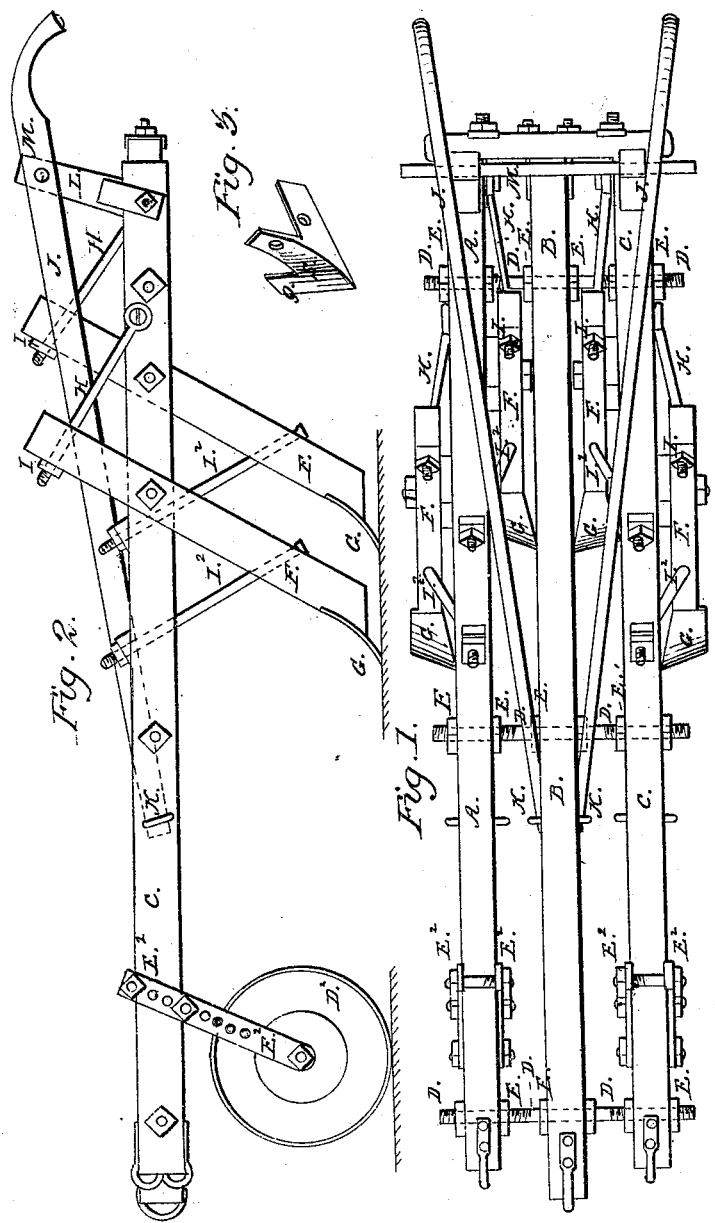

JOHN MURPHY, OF ALBANY, GEORGIA.

Letters Patent No. 66,871, dated July 16, 1867.

CULTIVATOR.

The Schedule referred to in these Letters Patent and making part of the same.

TO ALL WHOM IT MAY CONCERN:

Be it known that I, JOHN MURPHY, of Albany, Dougherty county, Georgia, have invented new and useful improvements in "Cultivators or Ploughs;" and I do hereby declare that the following is a full, clear, and exact description thereof, which will enable those skilled in the art to make and use the same, reference being had to the accompanying drawings, forming part of this specification.

The present invention relates to a cultivator or plough, more particularly adapted to ploughing the ground for the cultivation of either cotton, corn, or sugar-cane, and the invention consists in so constructing the frame to the plough or cultivator that its several ploughs or cultivators can be adjusted to any width or space between the rows as the ground may require, or to plough a single row upon each side, clearing out one half of the ground upon each side, or to throw the dirt either to or from the plants in the ground, and so that the plough or cultivator can be susceptible of being used either single or double.

This invention also consists in a novel plough-blade for ploughing cotton lands when the cotton has grown to such a height that the ground cannot be ploughed deep.

In the accompanying plate of drawings, my improvements in cultivators or ploughs are illustrated—

Figure 1 being a plan or top view of the same;

Figure 2 an elevation of one side; and

Figure 3 a detail view of a plough-blade suitable for ploughing cotton when grown to such a height that the ground cannot be ploughed deep.

Similar letters of reference indicate corresponding parts.

A, B, and C in the drawings represent three beams, placed one alongside of the other, and joined together at different points of their length by means of screw-threaded bolts or rods D and screw-nuts E, in such a manner as to hold the several beams apart or separate from each other, in parallel lines or directions. By these bolts and their nuts the several beams A, B, and C can be set at a greater or lesser distance apart, as and for a purpose to be hereinafter described. To each of the outside beams A and C of the three beams A, B, and C, and at or near one end of the same, a guide and running wheel, $D^2$, is hung, through arms $E^2$, applied by screw-bolts and nuts thereto, as shown in the drawings, so that they can be readily changed and adjusted in position upon the beam, either more or less to the front. F the plough-beams, each with a plough-blade, G, at one end, and at the others secured by a screw-bolt and nut to the outside beams A and C of the series of beams A, B, and C, one plough-beam each upon the outside and inside of such beams A and C, but with the several ploughs situated, respectively, as shown. The upper ends of the plough-beams are steadied by brace-rods H hinged to the beams A and C at one end, and at their other passing through the said plough-beams, with screw-nuts I upon them, and also by stay-rods $I^2$ properly applied therefor. J the handle-arms to the frame A B and C, which arms are inserted at one end in loops K upon the centre-beam B, from which they extend upward in an inclined direction toward the rear end of such beam, and are there fastened in position to uprights L by means of a cross-pin, M.

By the construction of the frame A B C herein described, the several ploughs can be arranged to operate at different distances apart, either more or less, and thus to plough in rows whether more or less distant apart. And that furthermore, by the hanging of the plough-beams, they can be readily attached and detached, and thus the plough or cultivator adapted for use as a double or single plough; and that, by the construction described, the whole plough or cultivator can be changed for use in all kinds of ploughing, with great dispatch and in the most easy and perfect manner. The plough-blade S shown in fig. 3 is for use in ploughing cotton lands when the cotton-plant has grown to such a height that the ground cannot be ploughed deep with safety to the plants, the blade being provided with an extension-arm or piece, Q, to allow the dirt as it is ploughed up to fall over the same.

What I claim as new, and desire to secure by Letters Patent, is—

1. The construction of the frame A B and C, in combination with the plough-beams F secured thereto, substantially as and for the purpose described.

2. I also claim the plough S, with its arm Q, substantially as and for the purpose specified.

The above specification of my invention signed by me this 21st day of March, 1867.

JOHN MURPHY.

Witnesses:
WM. F. MCNAMARA,
ALBERT W. BROWN.